(12) United States Patent
Corbitt, III

(10) Patent No.: US 8,079,173 B2
(45) Date of Patent: Dec. 20, 2011

(54) FISHING LURE WITH WEIGHTED HYDRODYNAMIC HEAD, MATED PLASTIC WORM AND PIVOTING HOOK

(75) Inventor: Newsome E. Corbitt, III, Franklin, NC (US)

(73) Assignee: Corbitt Ventures, Inc., Franklin, NC (US)

( * ) Notice: Subject to any disclaimer, the term of this patent is extended or adjusted under 35 U.S.C. 154(b) by 0 days.

(21) Appl. No.: 12/048,217

(22) Filed: Mar. 14, 2008

(65) Prior Publication Data
US 2008/0155883 A1 Jul. 3, 2008

Related U.S. Application Data

(63) Continuation-in-part of application No. 11/021,957, filed on Dec. 24, 2004, now Pat. No. 7,340,858.

(51) Int. Cl.
*A01K 85/01* (2006.01)
*A01K 85/00* (2006.01)

(52) U.S. Cl. ............... 43/42.36; 43/42.24; 43/42.39; 43/42.1; 43/42.31; 43/42.06

(58) Field of Classification Search ............ 43/42.36, 43/42.39, 42.24, 42.1, 42.41, 42.31, 42.06
See application file for complete search history.

(56) References Cited

U.S. PATENT DOCUMENTS

| | | | | |
|---|---|---|---|---|
| 981,454 A * | 1/1911 | Miller et al. | | 43/42.36 |
| 1,454,820 A * | 5/1923 | Readle | | 43/42.05 |
| 1,515,849 A * | 11/1924 | Eppinger | | 43/42.4 |
| 1,768,033 A * | 6/1930 | Deatz | | 43/42.4 |
| 1,948,983 A * | 2/1934 | Danielesuk | | 43/42.36 |
| 2,078,816 A * | 4/1937 | Shenitz | | 43/42.36 |
| 2,241,367 A * | 5/1941 | Sarff | | 43/42.1 |
| 2,292,517 A * | 8/1942 | Greene | | 43/42.39 |
| 2,591,558 A * | 4/1952 | Kramer | | 43/44.9 |
| 2,606,387 A * | 8/1952 | Garner | | 43/42.2 |
| 2,977,707 A * | 4/1961 | Dreher | | 43/42.12 |
| 3,031,792 A * | 5/1962 | Swenson | | 43/42.2 |
| 3,151,413 A * | 10/1964 | Witz | | 43/42.39 |
| 3,170,756 A * | 2/1965 | Butler | | 43/42.1 |
| 3,269,050 A * | 8/1966 | Garwood | | 43/42.36 |
| 3,344,549 A * | 10/1967 | Peters et al. | | 43/42.39 |

(Continued)

*Primary Examiner* — Darren W Ark
(74) *Attorney, Agent, or Firm* — Mark Young, P.A

(57) ABSTRACT

A fishing lure includes a weighted hydrodynamic head, mated artificial bait and pivoting hook. The weighted hydrodynamic head includes an integrally molded, conically-shaped or pyramid-shaped malleable body with a plurality of fins projecting laterally therefrom, a blunt leading edge, a trailing edge, a central passage extending from the leading edge to the trailing edge, and a slot formed in the side of the body and extending into the central passage. The weighted hydrodynamic head is made of a dense material such as lead. The hook is an offset hook including an eyelet, a proximal shank, an offset bend section, a distal shank, a u-shaped bend and a pointed barbed tip. The distal shank and proximal shank are substantially parallel. The eyelet, which projects through the central passage in the leading edge and the distal shank, is aligned with and extends longitudinally from the slot. The artificial bait includes a resilient elastomeric body with a head end configured to be received in the central passage, the body being hooked by the u-shaped bend of the hook. The fins extend in a fore and aft direction and for almost the entire length of the conically-shaped malleable body of the weighted hydrodynamic head. The slot is occluded (i.e., pinched partially closed) to resist withdrawal of the hook but still allow limited pivoting and translational motion. The hook may also be colored to generally match the color of the bait.

20 Claims, 5 Drawing Sheets

U.S. PATENT DOCUMENTS

| | | | | |
|---|---|---|---|---|
| 3,426,467 | A * | 2/1969 | Bryant | 43/42.36 |
| 3,497,987 | A * | 3/1970 | Perrin | 43/42.39 |
| 3,530,612 | A * | 9/1970 | Garrison | 43/42.39 |
| 3,693,275 | A * | 9/1972 | Craig | 43/42.39 |
| 3,722,128 | A * | 3/1973 | Tremblay | 43/42.1 |
| 3,854,233 | A * | 12/1974 | Browning, III | 43/42.31 |
| 3,908,298 | A * | 9/1975 | Strader | 43/42.39 |
| 3,909,974 | A * | 10/1975 | Kent | 43/42.39 |
| 3,914,895 | A * | 10/1975 | Mize | 43/42.1 |
| 4,008,539 | A * | 2/1977 | Gardner | 43/42.31 |
| 4,037,346 | A * | 7/1977 | Holst | 43/42.14 |
| 4,045,903 | A * | 9/1977 | Parker | 43/42.39 |
| 4,054,004 | A * | 10/1977 | Schott | 43/42.39 |
| 4,094,087 | A * | 6/1978 | Carpenter | 43/42.24 |
| 4,139,964 | A * | 2/1979 | Pelletier | 43/42.19 |
| 4,163,337 | A * | 8/1979 | Kress | 43/42.36 |
| 4,167,076 | A * | 9/1979 | Weaver | 43/42.36 |
| 4,501,086 | A * | 2/1985 | Bunce | 43/42.05 |
| 4,653,212 | A * | 3/1987 | Pixton | 43/42.39 |
| 4,672,768 | A * | 6/1987 | Pippert | 43/42.24 |
| 4,703,579 | A * | 11/1987 | Kay | 43/42.24 |
| 4,744,167 | A * | 5/1988 | Steele | 43/42.36 |
| 4,803,798 | A * | 2/1989 | Hannah | 43/42.36 |
| 4,817,325 | A * | 4/1989 | Thomas | 43/42.1 |
| 4,907,364 | A * | 3/1990 | Hedman | 43/42.39 |
| 4,914,851 | A * | 4/1990 | Acker | 43/42.1 |
| 4,942,689 | A * | 7/1990 | Link et al. | 43/42.36 |
| 4,969,287 | A * | 11/1990 | Johnson | 43/42.31 |
| 5,025,586 | A * | 6/1991 | Pixton | 43/42.39 |
| 5,040,325 | A * | 8/1991 | Herrmann | 43/42.36 |
| 5,113,607 | A * | 5/1992 | Pate | 43/42.36 |
| 5,121,568 | A * | 6/1992 | Lindmeyer | 43/42.36 |
| 5,144,765 | A * | 9/1992 | Keeton | 43/42.36 |
| 5,230,178 | A * | 7/1993 | Dillard | 43/42.31 |
| 5,233,785 | A * | 8/1993 | Ching | 43/42.36 |
| 5,259,151 | A * | 11/1993 | Wicht | 43/42.31 |
| 5,299,378 | A * | 4/1994 | Ballard | 43/42.1 |
| 5,335,441 | A * | 8/1994 | Blackwell | 43/42.39 |
| 5,367,817 | A * | 11/1994 | Clark | 43/42.39 |
| 5,377,442 | A * | 1/1995 | Gariglio | 43/44.4 |
| 5,381,622 | A * | 1/1995 | Tregre | 43/42.31 |
| 5,428,919 | A * | 7/1995 | Enomoto | 43/42.31 |
| 5,490,345 | A * | 2/1996 | Infinger | 43/42.39 |
| 5,491,927 | A * | 2/1996 | Ortiz | 43/42.39 |
| 5,533,296 | A * | 7/1996 | Jansen | 43/42.36 |
| 5,661,922 | A * | 9/1997 | Bonomo | 43/42.31 |
| 5,778,593 | A * | 7/1998 | Baron | 43/42.39 |
| 6,061,948 | A * | 5/2000 | Boucek | 43/42.39 |
| 6,176,035 | B1 * | 1/2001 | Somogyi | 43/42.31 |
| 6,327,808 | B1 * | 12/2001 | Zascavage | 43/42.36 |
| 6,357,167 | B1 * | 3/2002 | Bradford | 43/42.31 |
| 6,519,895 | B1 * | 2/2003 | Bennett | 43/42.39 |
| 6,546,666 | B2 * | 4/2003 | Schultz et al. | 43/42.39 |
| 6,598,336 | B2 * | 7/2003 | Link | 43/42.24 |
| 6,708,442 | B2 * | 3/2004 | Kress et al. | 43/44.4 |
| 6,993,866 | B1 * | 2/2006 | Strange | 43/42.36 |
| 7,076,911 | B2 * | 7/2006 | Thorne | 43/42.39 |
| 7,234,267 | B1 * | 6/2007 | Konstant | 43/42.39 |
| 7,263,798 | B2 * | 9/2007 | Nichols | 43/42.24 |
| 7,340,858 | B2 * | 3/2008 | Corbitt | 43/44.96 |
| 2003/0159328 | A1 * | 8/2003 | Acker | 43/42.37 |
| 2004/0016172 | A1 * | 1/2004 | Sims | 43/42.06 |
| 2004/0107626 | A1 * | 6/2004 | Sims | 43/42.06 |
| 2004/0216359 | A1 * | 11/2004 | Mitchell | 43/42.36 |
| 2004/0216360 | A1 * | 11/2004 | Holtzhampf | 43/42.39 |
| 2005/0217165 | A1 * | 10/2005 | Anderson | 43/42.39 |
| 2005/0246941 | A1 * | 11/2005 | Mitchell | 43/42.39 |
| 2006/0042147 | A1 * | 3/2006 | Jenkins | 43/42.36 |
| 2008/0127542 | A1 * | 6/2008 | Young | 43/42.39 |
| 2008/0163540 | A1 * | 7/2008 | Ridolfi | 43/42.36 |
| 2008/0196293 | A1 * | 8/2008 | Milanowski | 43/42.36 |

* cited by examiner

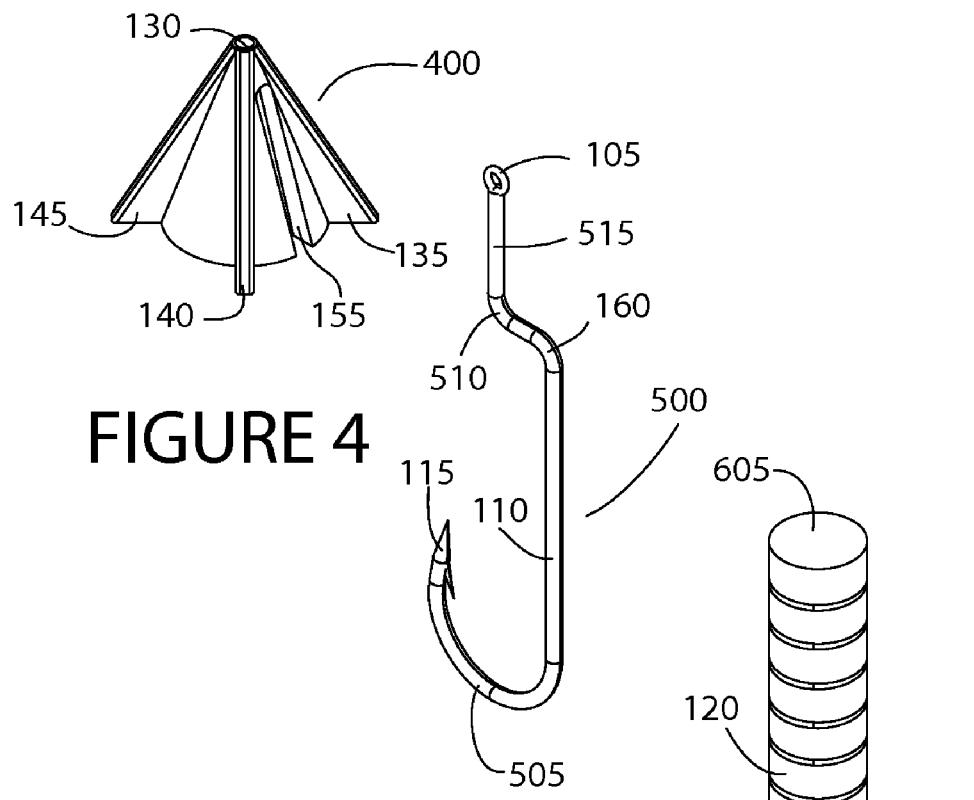
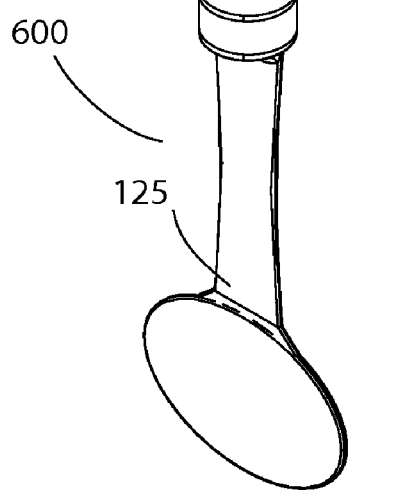

FISHING LURE WITH WEIGHTED HYDRODYNAMIC HEAD, MATED PLASTIC WORM AND PIVOTING HOOK

RELATED APPLICATION

This application is a continuation-in-part of and claims the benefit of priority of U.S. nonprovisional application Ser. No. 11/021,957, filed Dec. 24, 2004 now U.S. Pat. No. 7,340,858, the entire contents of which are incorporated herein by this reference.

FIELD OF THE INVENTION

This invention generally relates to fishing, and more particularly, to a lure assembly configured for attachment to a fishing line.

BACKGROUND

Many fishing lures known in the art may adequately attract fish. While lures are useful artificial bait, they have several shortcomings. First, they often become snagged or hung up, particularly in fishing areas with oyster beds, rocks, brush, weed beds, stumps or debris on the bottom. Sinkers used with the lures do not generate lift, causing the lure to drag the seabed when reeled in. As a result, many of these snag infested fishing waters are considered "off limits" with certain conventional sinkers.

Additionally, many conventional lures are not weighted, which necessitates a heavy sinker or renders the lure vulnerable to rolling or drifting with the current. Rolling, which is pronounced in waters with strong currents, may undesirably twist the line. Such twisting may weaken the line, break the line, impede proper casting and cause the line to unravel from a spool and result in a twisted mess known as a backlash or birds nest.

Furthermore, many conventional lures are susceptible to being thrown by a fish because the hook does not move relative to the lure. A fish that bites the lure may attempt to throw the hook by rapid side to side movement. The forces attributed to hydrodynamic resistance caused by the lure moving through the water are transmitted to the hook. These forces may tend to free the hook from the fishes mouth.

On conventional lures, the sinker slides up the line when cast. When reeled in, debris such as weeds are caught between the sinker and the lure. To avoid this problem, some anglers will wedge a shim such as a broken toothpick in the opening of the sinker to prevent the sinker from sliding up the line. Unfortunately, the wedged shim tends to weaken the fishing line.

What is needed is a weighted, snag resistant, throw resistant lure with a weight that does not separate from the lure. The invention is directed to overcoming one or more of the problems and solving one or more of the needs as set forth above.

SUMMARY OF THE INVENTION

To solve one or more of the problems set forth above, in an exemplary implementation of the invention, a fishing lure with a weighted hydrodynamic head, mated artificial bait and pivoting hook is provided. The weighted hydrodynamic head includes an integrally molded, conically-shaped or pyramid-shaped malleable body with a plurality of fins projecting laterally therefrom, a blunt leading edge, a trailing edge, a central passage extending from the leading edge to the trailing edge, and a slot formed in the side of the body and extending into the central passage. The weighted hydrodynamic head is made of a dense material having a specific gravity greater than 1.0, such as a dense material used in sinker fabrication, e.g., a metal like lead, zinc, babbitt, steel and aluminum. The hook is an offset hook including an eyelet, a proximal shank, an offset bend section, a distal shank, a u-shaped bend and a pointed barbed tip. The distal shank and proximal shank are substantially parallel. The eyelet, which projects through the central passage in the leading edge and the distal shank, is aligned with and extends longitudinally from the slot. The artificial bait includes a resilient elastomeric body with a head end configured to be received in the central passage, the body being hooked by the u-shaped bend of the hook. The fins extend in a fore and aft direction for almost the entire length of the conically-shaped malleable body of the weighted hydrodynamic head. The fins may taper in thickness and lateral extension, or be uniform in thickness but taper in lateral extension, from the trailing edge of the weighted hydrodynamic head to the blunt leading edge of the weighted hydrodynamic head. The slot is occluded (i.e., pinched partially closed) to resist withdrawal of the hook but still allow limited pivoting and translational motion. The tail of the bait may be a flat tail, a paddle tail or a curly tail. The resilient elastomeric body includes a plurality of ribs extending circumferentially around the body and positioned generally orthogonal to a longitudinal axis of the resilient elastomeric body. The hook is composed of high-carbon steel, steel alloyed with vanadium, or stainless steel and may include a corrosion resistant surface coating. The hook may also be colored to generally match the color of the bait.

BRIEF DESCRIPTION OF THE DRAWINGS

The foregoing and other aspects, objects, features and advantages of the invention will become better understood with reference to the following description, appended claims, and accompanying drawings, where:

FIG. 4 shows a plan view of an exemplary hydrodynamic head for an exemplary an exemplary fishing lure according to principles of the invention; and FIG. 5 shows a plan view of an exemplary hook for an exemplary fishing lure according to principles of the invention; and FIG. 6 shows a plan view of an exemplary artificial bait for an exemplary an exemplary fishing lure according to principles of the invention.

Figure 1:
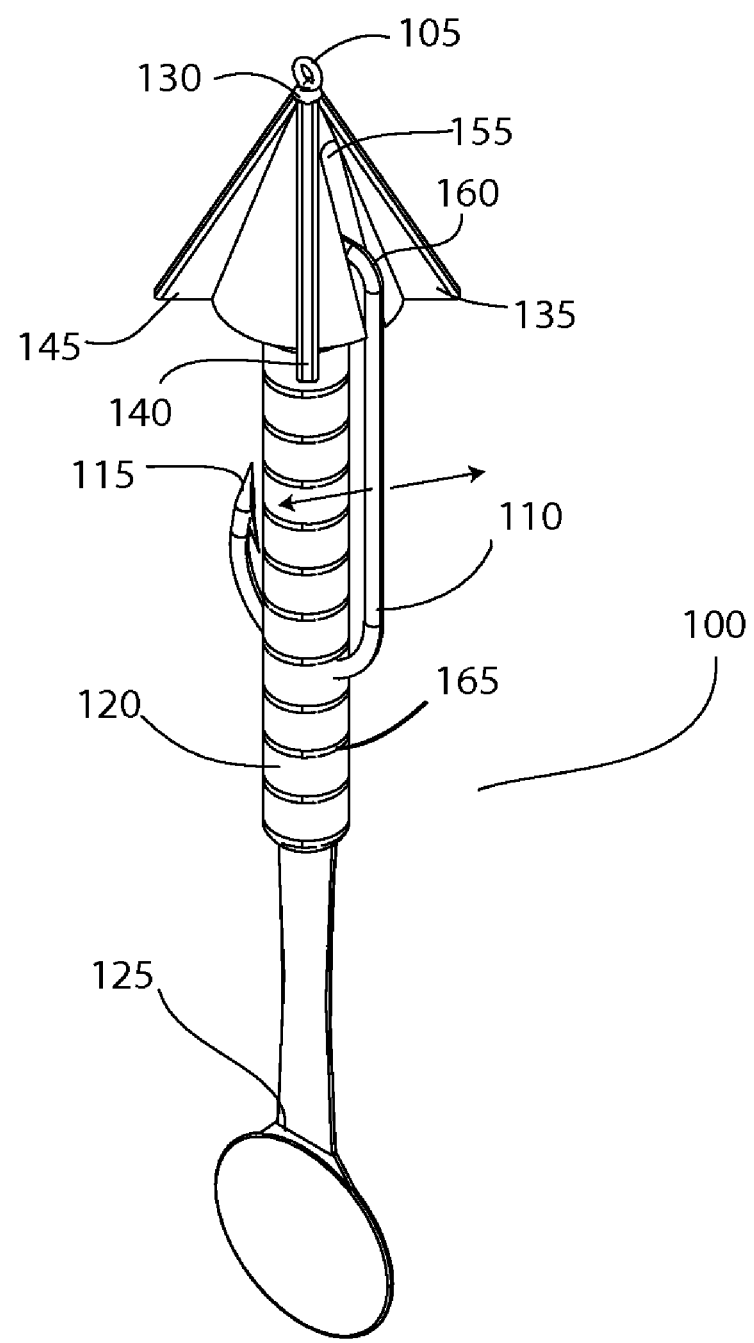
FIG. 1 shows a first perspective view of an exemplary fishing lure with a weighted hydrodynamic head, mated plastic worm and pivoting hook, according to principles of the invention.
Figure 2:
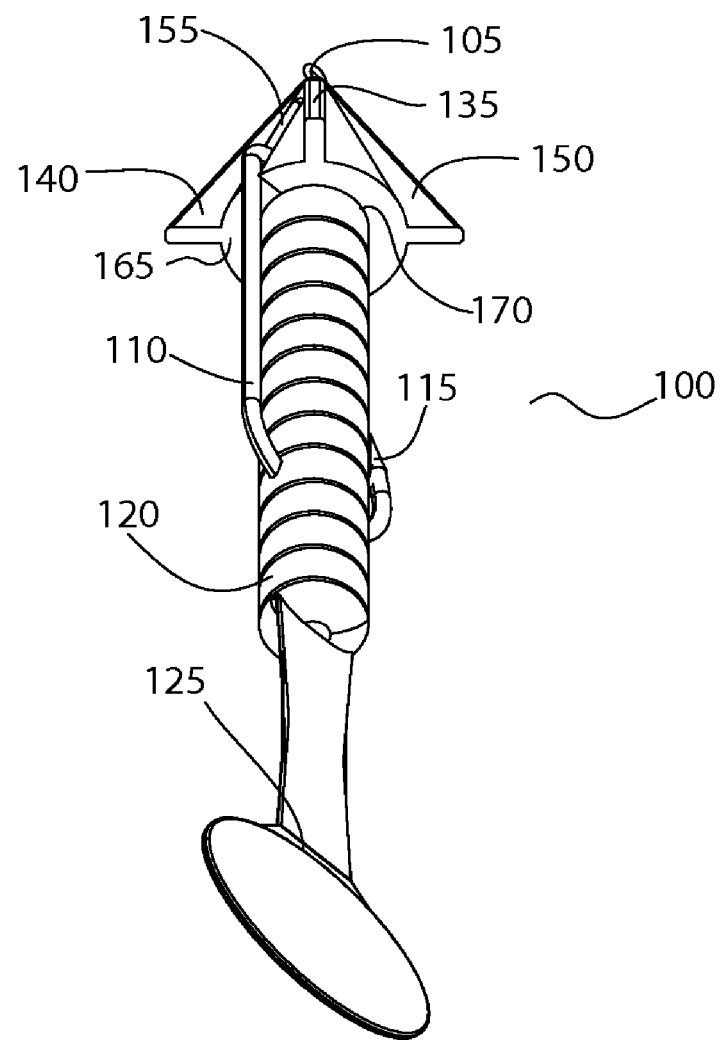
FIG. 2 shows a second perspective view of an exemplary fishing lure with a weighted hydrodynamic head, mated plastic worm and pivoting hook, according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the types of plastic bait, shapes, relative sizes, ornamental aspects or proportions shown in the figures.

DETAILED DESCRIPTION

Referring to the Figures, in which like parts are indicated with the same reference numerals, various views of an exemplary fishing lure with a weighted hydrodynamic head, mated plastic worm and pivoting hook are shown. The term "plastic worm" is used herein for convenience to refer to a form of plastic bait. The invention is not limited to worm-like bait as shown in the Figures. Instead, the invention may be utilized with any type of artificial bait (i.e., "plastic bait"), in any shapes and sizes, including, but not limited to, lizards, frogs, insects and other natural and fanciful bait shapes suitable for fishing.

As shown in FIG. 1, the invention is directed to a fishing lure 100 that simulates natural bait when cast into and drawn through water. The fishing lure 100 includes a weighted hydrodynamic head 400 (as shown in FIG. 4), hook 500 (as shown in FIG. 5), and plastic bait 600 (as shown in FIG. 6).

The weighted hydrodynamic head 400 (as shown in FIG. 4) is comprised of an integrally molded weighted body having a forwardly tapered pyramid-shaped or conically-shaped body with four fins 135-150 projecting laterally therefrom. Fins 135-150 extend in a fore and aft direction for almost the entire length of the body of the weighted hydrodynamic head 400. The fins 135-150 may taper in thickness and lateral extension from the trailing edge base of the sinker to the blunt leading edge of the sinker. Alternatively, the fins 135-150 may have a uniform thickness, but taper in lateral extension from the trailing edge base of the sinker to the blunt leading edge of the sinker.

Figure 3:
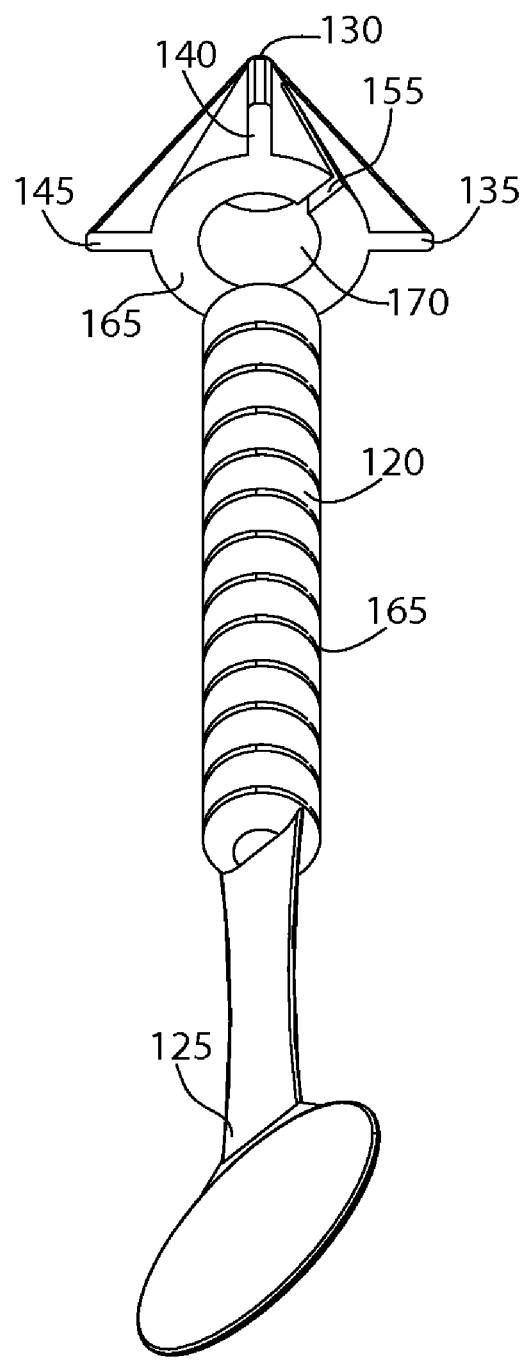
FIG. 3 shows a perspective view of an exemplary hydrodynamic head separated from a corresponding plastic worm for an exemplary fishing lure according to principles of the invention.

The weighted hydrodynamic head 400 has a bulbous (i.e., blunt), semi-spherical front leading edge 130 and a relatively flat generally rectangular finned trailing edge 165 (as shown in FIG. 3). The bulbous (i.e., blunt), semi-spherical front leading edge 130 includes an aperture to allow passage of a hook eyelet 105.

A central passage 170 extends through the center of the head 400. The passage 170 provides a compartment within the head 400 for receiving the head end 605 of the plastic bait 600.

A slot 155 extends longitudinally in a fore and aft direction for a majority length of the body of the weighted hydrodynamic head 400. The slot 155 provides access to the central passage 170 from a side of the head 400, between adjacent fins 135-140. Because the head 400 is malleable, the slot 155 may be pinched to form an occlusion that resists withdrawal of the hook 400.

The weighted hydrodynamic head 400 is desirably cast of any suitable dense material having a specific gravity substantially greater than 1.0. Such materials may include metal, such as lead, steel, stainless steel, zinc, babbitt, aluminum, alloys thereof, composites or the like. Plastic materials such as polyvinyl chloride (PVC), nylon, polysulfone, polyethylene, polypropylene, polystyrene, acrylics, cellulosics, acrylonitrile-butadiene-styrene (ABS) terpolymers, urethanes, thermo-plastic resins, thermo-plastic elastomers (TPE), acetal resins, polyamides, polycarbonates and/or polyesters, as well as synthetic rubber such as polyisobutylene, nitrile rubber or Buna-N, polybutadiene and rubber made from the polymerization of a variety of monomers including isoprene (2-methyl-1,3-butadiene), 1,3-butadiene, chloroprene (2-chloro-1,3-butadiene), and isobutylene (methylpropene) with a small percentage of isoprene for cross-linking. Other suitable polymeric compositions are known to those familiar with the art and may also be used in accordance with the present invention. Preferably the chosen material is relatively inexpensive, produces a durable and strong product, is easy to use in manufacturing operations and results in an aesthetically acceptable product. Additionally, the product should have a density greater than that of water to facilitate sinking. Fillers such as glass, carbon, metals and minerals may be added to plastics to achieve a desired density. The sinker may be made in a variety of sizes and weights. In weights from three eighths ounce up, the sinker may preferably be made of a heavy metal such as lead, but in weights from three eighths ounce down, the sinker may preferably made of lighter metal such as zinc or aluminum. In a particular preferred embodiment the material is also malleable.

The bait 600 comprises a body 120 having a head end 605 and a tail 125. In an exemplary embodiment, the bait 600 imitates a worm (as shown in the Figures). However, the invention is not limited to wormlike structures. Imitations of other prey, such as a frog, fish, lizard, crustacean, or insect, having a configuration enabling the lure to maintain an attitude or position of natural bait while pulled through the water may be utilized within the scope of the invention. The tail 125 may be a flat tail, as shown in the Figures, a paddle tail, a curly tail, or other appropriate structure. The body 120 may include a plurality of ribs 165 extending circumferentially around the body and positioned generally orthogonal to a longitudinal axis of the body 120 to 165 help produce a turbulent boundary layer and reduce drag of the body 120 as it travels through the water. Other optional body features may include legs, eyes, wings, antennae and the like. The bait 600 is formed from resilient elastomeric materials, such as, but not limited to, plastic, rubber, and other appropriate resilient elastomeric materials.

The lure 100 is rigged with an offset hook 500 comprising a proximal shank 515 with an eyelet 105 at a first free end and a first offset bend 510 arcuately extending from the second opposite end of the shank 515. The eyelet 105 fits through the aperture 130 in the head 400. A second offset bend 160 extends from the first offset bend 510 and leads to the proximal end of a distal shank 110. The distal shank 110 and proximal shank 515 are generally parallel but offset by a distance defined by the first and second offset bends 510 and 160 and any portion intermediate thereto. A generally unshaped bend 505 extends from the distal end of the distal shank 110. A barbed point 115 is formed on the free end of the bend 505, facing the distal shank 110. The proximal shank 515 is disposed laterally between the distal shank 110 and the barbed point 115. This configuration ensures that the point of the hook rides in an ideal position for increased hook penetration. Further, the offset and bend 505 provides a large gap for easier penetration.

The hook 500 is manufactured from either high-carbon steel, steel alloyed with vanadium or stainless steel. Optionally, the hook 500 may be covered with a corrosion resistant surface coating such as a clear lacquer, a metallic coating such as gold, nickel, or tin, or a polymeric coating, such as polytetrafluoroethylene.

Additionally, the hook 500 may optionally be colored to generally match the bait 600. Thus, the hook 500 is camouflaged to reduce the risk of visual detection by a fish.

To assemble the lure 100, the eyelet 105 of the hook 500 is inserted into the central passage 170 through the aperture in the leading edge 130 of the head 400. The offset bends 510 and 160 are aligned with the slot 155. The body 120 of the bait 600 is then pierced by the hook, such that the bend 505 engages the body and the distal shank 110 runs substantially parallel to the body 120 to the slot 155. The head end 605 of the body 120 extends into the central passage 170. The diameter of the central passage 170 is approximately the same as or slightly larger than the diameter of the head end of the body 120. The proximal shank 515 extends through the central passage 170 to the eyelet 105. The malleable head 400 is pinched to occlude the central passage 170 and the aperture 155 and prevent withdrawal of the head end 610 of the body and the hook 500.

Significantly, the hook is not fixed. While the occlusion prevents withdrawal, it permits limited pivotal and translational movement of the hook 500. Concomitantly, tensile forces exerted on the eyelet 105 are transmitted through the hook 500 to the engaged portion of the body 120. Because the body 120 is comprised of a resilient compressible material, it compresses and absorbs the energy of the tensile force and returns to its original uncompressed state when the force is relieved. These pivotal, translational and compressive actions prevent a fish from throwing a hook 500. These actions (i.e., degrees of freedom) also enable the hook 500 to remain in the body 120 and the bait 600 coupled to the head 400, even as the eyelet 105 is pulled from a line. The hook 500 remains in position while being cast repeatedly and even after numerous fish have been caught using the lure 100. Furthermore, these actions (i.e., degrees of freedom) facilitate freeing the lure 100 from any underwater obstacles and reduce the risk of breakage.

During use, the lure 100 may be cast and retrieved through the water to simulate a natural bait. The weighted hydrodynamic head 400 enables the lure 100 to maintain a horizontal attitude while being pulled through the water. In other words, the longitudinal axis may be generally horizontal when pulled through the water. Maintaining the proper attitude of the lure 100 entices a strike.

Advantageously, the streamlined shape of the head also makes it more aerodynamic during casting and minimizes splashing during entry into water. The blunt leading edge 130 leads the way through the air and into the water. The weight of the head causes the lure to dive. As the sinker is drawn through the water, the fins 135-150 keep it on a straight course and counteracts any tendency for the lure 100 to veer to one side or the other. The fins resist rotation. Any tendency for the lure 100 to rotate is minimized due to the fact that the fins 135-150 are symmetrical. The blunt leading edge 130 and streamlined shape of the lure 100 reduces the tendency to snag in weeds and catch on underwater objects such as tree stumps or the like. As the lure 100 travels through water in direction of the leading edge 130 (i.e., blunt vertex), the leading edge becomes slightly elevated and the bottom and top triangular sides of the polyhedron body generate a net lifting force. Thus, the head 400 of the lure 100 functions as a hydrofoil which produces a net lift force. The lift helps elevate the lure 100 off the floor, which reduces the tendency to snag objects on the bottom. Concomitantly, the geometry of the exemplary lure 100 resists rolling and drifting on the bottom, which tend to interfere with detection of bites. The geometry is not conducive to rolling and drift with bottom currents. Thus, the lure 100 is not susceptible to drag and drifting forces on the line for a fish to detect.

As another advantage, the weighted head 400 remains attached to the body 120 of the lure 100, which prevents separation of the weight and lure body. Additionally, the lure 100 may be attached to the line at the eyelet 105, which prevents the weight 400 and lure body 120 from sliding along a line. Thus, the lure 100 is not conducive to trapping debris between the sinker and lure body.

Figure 7:
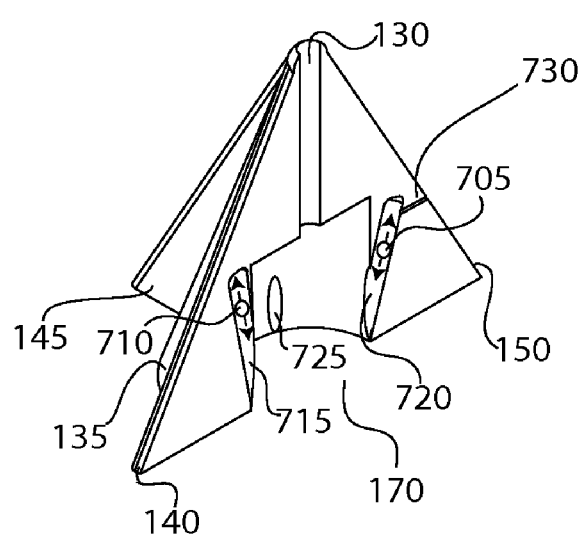
FIG. 7 shows a perspective cutaway view of an exemplary weighted hydrodynamic head for an exemplary fishing lure according to principles of the invention.

One of the most important aspects of fishing is to attract fish. A fish must be tempted to seize the hook 110. To attract fish a lure in accordance with principles of the invention provides artificial bait 120 on the hook 110, such that the bait's 120 motion will entice fish. In addition to the bait 120 on the hook 110, in another exemplary embodiment fin-based rattles are provided as another means for attracting fish in the general vicinity. Noise is a well-documented attractant to fish. In the exemplary embodiment shown in the section view of FIG. 7, the fins 135-150 contain channels 715-725 for receiving an object such as a metal ball 705 and 710 or bearing that makes percussive noises when shaken. Optionally, one or more perforations or conduits 730 may lead from the channels 715-725 to the exterior of the fin 150 thus providing a path to facilitate propagation of sound waves caused by the ball 705. As shown in the exemplary embodiment of FIG. 7, the balls 705 and 710 may be held in the channel 715-725 by the portion of the artificial bait that extends into central passage 170. The passage 170 provides a compartment within the head 400 for receiving the head end 605 of the plastic bait 600. In such an embodiment the balls 705 and 710 may be removed and/or replaced and/or supplemented to effectuate a particular sound. The invention is not limited to any particular shaped channel or to rattling balls. Other shaped channels may be used in addition to or in lieu of cylindrical channels. Likewise, other shaped rattling objects may be used in addition to or in lieu of spherical balls. Additionally, other releasable and permanent closures such as plugs and fillers may be used to seal the ball in the channel.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A fishing lure comprising a weighted hydrodynamic head, a hook, and an artificial bait:

said weighted hydrodynamic head comprising of an integrally molded, conically-shaped malleable body with a plurality of fins projecting laterally therefrom, a blunt leading edge, a trailing edge, a central passage extending from said leading edge to said trailing edge, and a slot formed in a side of the body and extending into the central passage, said weighted hydrodynamic head comprising a dense material having a specific gravity greater than 1.0;

said hook being an offset hook comprising an eyelet, a proximal shank, an offset bend section, a distal shank, a u-shaped bend and a pointed tip, said distal shank and proximal shank being substantially parallel, said eyelet projecting through the central passage in the leading edge and said distal shank being aligned with and extending longitudinally from said slot; and said artificial bait comprising a resilient elastomeric body with a head end configured to be received in the central passage, said body being hooked by the u-shaped bend of the hook.

2. A fishing lure according to claim 1, said fins extending in a fore and aft direction for almost an entire length of the conically-shaped malleable body of the weighted hydrodynamic head.

3. A fishing lure according to claim 1, said fins tapering in thickness and lateral extension from the trailing edge of the weighted hydrodynamic head to the blunt leading edge of the weighted hydrodynamic head.

4. A fishing lure according to claim 1, said fins having a uniform thickness and tapering in lateral extension from the trailing edge of the weighted hydrodynamic head to the blunt leading edge of the weighted hydrodynamic head.

5. A fishing lure according to claim 1, said slot being occluded to resist withdrawal of the hook.

6. A fishing lure according to claim 1, said weighted hydrodynamic head comprising a dense material from the group consisting of lead, zinc, steel, babbitt, and aluminum.

7. A fishing lure according to claim 1, said bait further comprising a tail.

8. A fishing lure according to claim 1, said bait further comprising a tail, said tail being a tail from the group consisting of a flat tail, a paddle tail, and a curly tail.

9. A fishing lure according to claim 1, said resilient elastomeric body including a plurality of ribs extending circumferentially around the body and positioned generally orthogonal to a longitudinal axis of the resilient elastomeric body.

10. A fishing lure according to claim 1, said hook further comprising a barbed point extending from a free end of the u-shaped bend.

11. A fishing lure according to claim 1, said hook further comprising a barbed point extending from a free end of the u-shaped bend and facing the distal shank.

12. A fishing lure according to claim 1, said hook comprising a material from the group consisting of high-carbon steel, steel alloyed with vanadium, and stainless steel.

13. A fishing lure according to claim 1, said hook further comprising a corrosion resistant surface coating.

14. A fishing lure according to claim 1, said bait having a color and said hook being colored to generally match the color of the bait.

15. A fishing lure comprising a weighted hydrodynamic head, a hook, and an artificial bait:

said weighted hydrodynamic head comprising of an integrally molded, pyramid-shaped malleable body with a plurality of fins projecting laterally therefrom, a blunt leading edge, a trailing edge, a central passage extending from said leading edge to said trailing edge, and a slot formed in a side of the body and extending into the central passage, said weighted hydrodynamic head comprising a dense material having a specific gravity greater than 1.0, and at least one of said plurality of fins including an internal channel and a rattling object contained therein;

said hook being an offset hook comprising an eyelet, a proximal shank, an offset bend section, a distal shank, a u-shaped bend and a pointed tip, said distal shank and proximal shank being substantially parallel, said eyelet projecting through the central passage in the leading edge and said distal shank being aligned with and extending longitudinally from said slot, and said slot being occluded to resist withdrawal of the hook, and a barbed point extending from a free end of the u-shaped bend; and said artificial bait comprising a resilient elastomeric body with a head end configured to be received in the central passage, said body being hooked by the u-shaped bend of the hook.

16. A fishing lure according to claim 15, said fins extending in a fore and aft direction for almost an entire length of the pyramid-shaped malleable body of the weighted hydrodynamic head.

17. A fishing lure according to claim 15, said fins tapering in thickness and lateral extension from the trailing edge of the weighted hydrodynamic head to the blunt leading edge of the weighted hydrodynamic head.

18. A fishing lure according to claim 15, said fins having a uniform thickness and tapering in lateral extension from the trailing edge of the weighted hydrodynamic head to the blunt leading edge of the weighted hydrodynamic head.

19. A fishing lure according to claim 15, said bait further comprising a tail, said tail being a tail from the group consisting of a flat tail, a paddle tail, and a curly tail.

20. A fishing lure according to claim 15, said resilient elastomeric body including a plurality of ribs extending circumferentially around the body and positioned generally orthogonal to a longitudinal axis of the resilient elastomeric body, and said bait having a color and said hook being colored to generally match the color of the bait.

* * * * *